US011885064B2

(12) United States Patent
Abramovich et al.

(10) Patent No.: US 11,885,064 B2
(45) Date of Patent: *Jan. 30, 2024

(54) APPARATUS FOR DRYING LAUNDRY OR OTHER ITEMS USING ULTRAVIOLET RADIATION

(71) Applicant: UVdry, LLC, Alpharetta, GA (US)

(72) Inventors: Dan Abramovich, Alpharetta, GA (US); Jerry Chieh Liu, Dunwoody, GA (US)

(73) Assignee: UVDRY, LLC, Alpharetta, GA (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/500,695

(22) Filed: Oct. 13, 2021

(65) Prior Publication Data

US 2022/0064847 A1 Mar. 3, 2022

Related U.S. Application Data

(63) Continuation of application No. 16/572,392, filed on Sep. 16, 2019, now Pat. No. 11,149,378, which is a continuation of application No. 14/537,164, filed on Nov. 10, 2014, now Pat. No. 10,415,176, which is a continuation of application No. 12/862,908, filed on Aug. 25, 2010, now Pat. No. 8,881,422.

(51) Int. Cl.
*D06F 58/26* (2006.01)
*D06F 58/20* (2006.01)
*F26B 3/28* (2006.01)

(52) U.S. Cl.
CPC ............ *D06F 58/203* (2013.01); *D06F 58/26* (2013.01); *F26B 3/28* (2013.01)

(58) Field of Classification Search
CPC ........... D06F 58/203; D06F 58/26; F26B 3/28
USPC ............................................................ 34/275
See application file for complete search history.

(56) References Cited

U.S. PATENT DOCUMENTS 5,664,340 A * 9/1997 Brown ...................... A61L 2/10 34/275
6,449,876 B1 * 9/2002 Pursell .................. F26B 11/182 34/108
6,877,248 B1 * 4/2005 Cross .................... D06F 58/203 34/275

* cited by examiner

*Primary Examiner* — John P McCormack
(74) *Attorney, Agent, or Firm* — John L. Doughty; DOUGHTY LAW, L.L.C.

(57) ABSTRACT

An apparatus for drying laundry with ultraviolet radiation is provided. One or more ultraviolet light sources emit ultraviolet radiation, which, in various embodiments, is transmitted through a UV-radiation permeable transparent drum containing the wet laundry and other wet articles to be dried. Also provided is a dryer having ultraviolet light sources centrally situated with respect to the drum, wherein the ultraviolet light sources emit ultraviolet radiation directed at laundry in the drum.

20 Claims, 9 Drawing Sheets

APPARATUS FOR DRYING LAUNDRY OR OTHER ITEMS USING ULTRAVIOLET RADIATION

CROSS REFERENCE TO RELATED APPLICATION AND CLAIM OF PRIORITY

This application claims priority under 35 U.S.C. § 120 to, and is a continuation of, U.S. patent application Ser. No. 16/572,392 filed Sep. 16, 2019, which claims priority under 35 U.S.C. § 120 to, and is a continuation of, U.S. patent application Ser. No. 14/537,164, filed Nov. 10, 2014, which issued as U.S. Pat. No. 10,415,176, which application claims priority under 35 U.S.C. § 120 to, and is a continuation of, U.S. patent application Ser. No. 12/862,908, filed Aug. 25, 2010, which issued as U.S. Pat. No. 8,881,422, all of which applications and patents are incorporated by reference herein in their entireties.

BACKGROUND

Consumers in modern society are facing an ever-increasing cost of living. The cost of energy is near the top of the list among the highest costs that consumers must deal with. In the home, a conventional clothes dryer can consume a large amount of energy, as much or more than a refrigerator. This consumption of energy occurs despite the fact that a clothes dryer does not operate constantly, as a refrigerator does. The modern consumer is also faced with more demands on his or her time. A clothes dryer that would provide significant cost and time savings would clearly be a boon to the modern consumer.

SUMMARY

A clothes dryer according to various implementations comprises: (A) a housing; (B) a laundry receptacle, mounted within the housing, that is adapted for receiving a load of wet laundry that is to be dried by the clothes dryer, the laundry receptacle comprising at least one ultraviolet permeable portion that is permeable to ultraviolet light; and (C) an ultraviolet light assembly that is adapted to direct ultraviolet light through the ultraviolet permeable portion of the laundry receptacle. In particular implementations, the clothes dryer is adapted to dry a wet load of laundry by transmitting ultraviolet light through the ultraviolet permeable portion of the laundry receptacle.

A clothes dryer according to further implementations comprises: (A) a housing; (B) a laundry receptacle that is rotatably mounted within the housing, the receptacle defining an interior portion that is dimensioned for storing a load of laundry; (C) a motor that is adapted for rotating the receptacle; and (D) one or more ultraviolet light assemblies that are adapted to substantially facilitate drying the load of laundry by directing ultraviolet light onto a load of laundry while the load of laundry is disposed within the interior portion of the receptacle and, optionally, while the receptacle is rotating.

A method of drying a load of laundry according to various implementations comprises the steps of: (A) providing a clothes dryer that comprises: (1) a laundry receptacle, and (2) an ultraviolet light assembly that is adapted to produce an amount of ultraviolet light that is sufficient to dry a load of wet laundry that is disposed within the laundry receptacle; and (B) while the load of laundry is disposed within the laundry receptacle, using the clothes dryer to dry the load of laundry. In various implementations, the clothes dryer dries the load of laundry by using the ultraviolet light assembly to direct the ultraviolet light onto the load of laundry until the load of laundry is substantially dry.

BRIEF DESCRIPTION OF THE DRAWINGS

Figure 1:
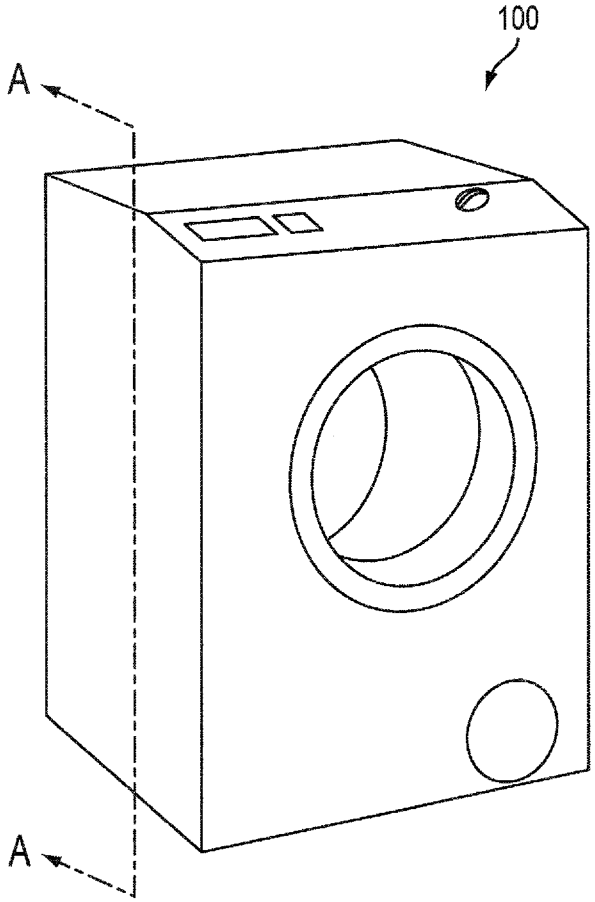

Having thus described various implementations in general terms, reference will now be made to the accompanying drawings, which are not necessarily drawn to scale, and wherein:

FIG. 1 is a perspective view of a dryer according to a particular implementation.

Figure 2:
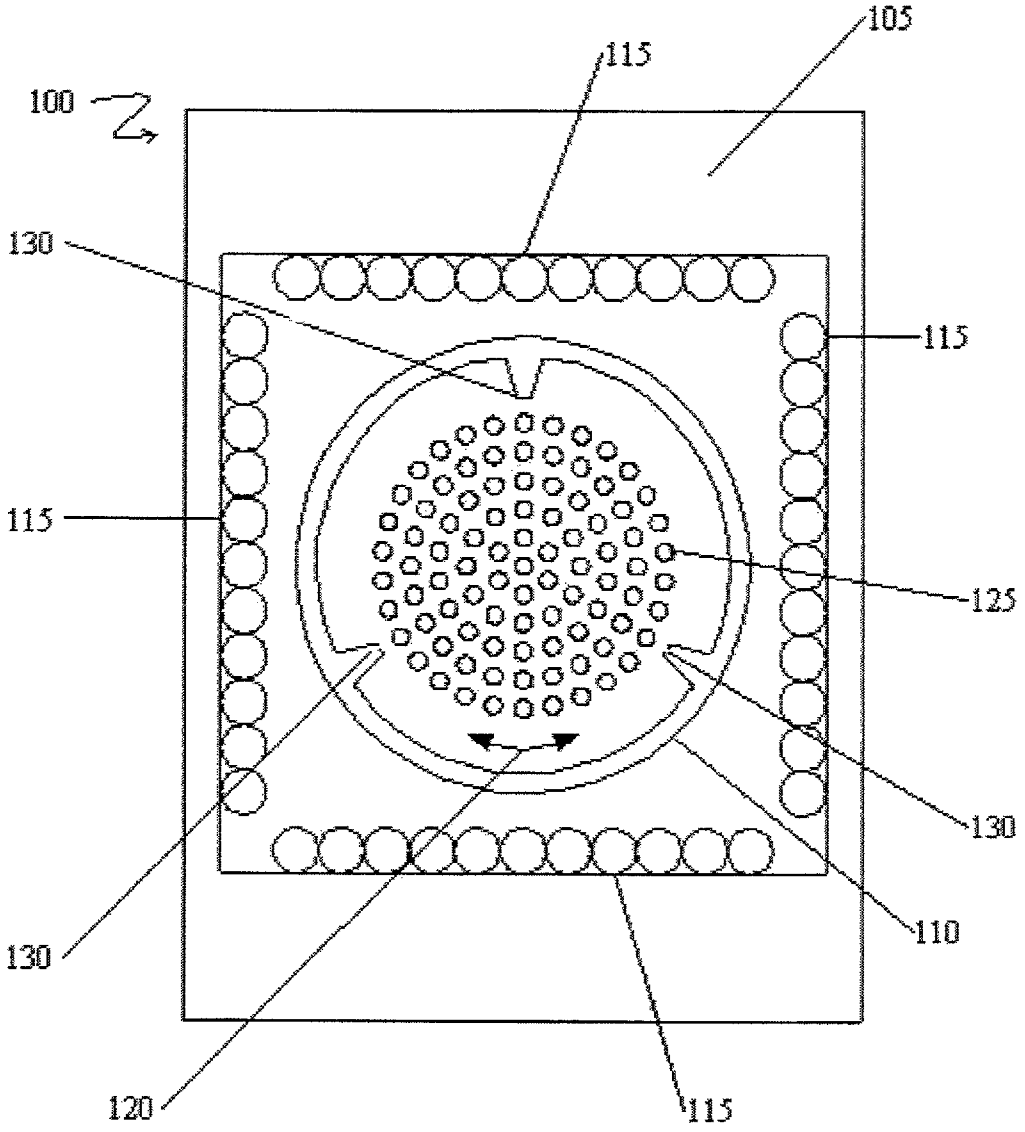

FIG. 2 is a cross-sectional view of a particular implementation of a dryer that may have, for example, the same general exterior configuration as the dryer shown in FIG. 1. This cross sectional view is taken about a section that corresponds to Section A-A in FIG. 1. In this implementation, the dryer includes multiple ultraviolet light sources that are positioned around the exterior of the dryer's drum.

Figure 3:
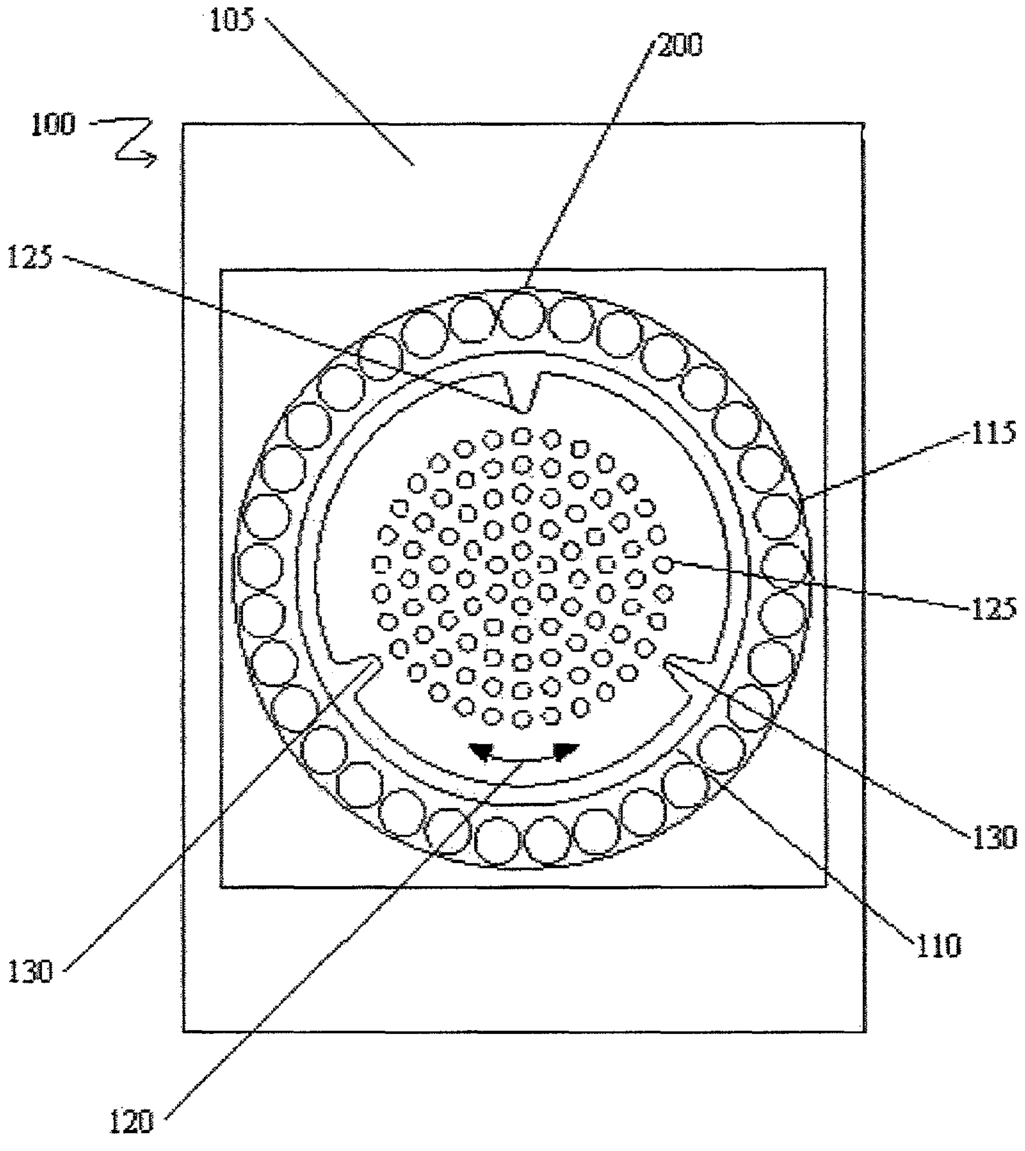

FIG. 3 is a cross-sectional view of another implementation of a dryer that may have, for example, the same general exterior configuration as the dryer shown in FIG. 1. This cross sectional view is taken about a section that corresponds to Section A-A in FIG. 1. In this implementation, the dryer includes multiple ultraviolet light sources that are substantially equidistant from the outer perimeter of the dryer's drum.

Figure 4:
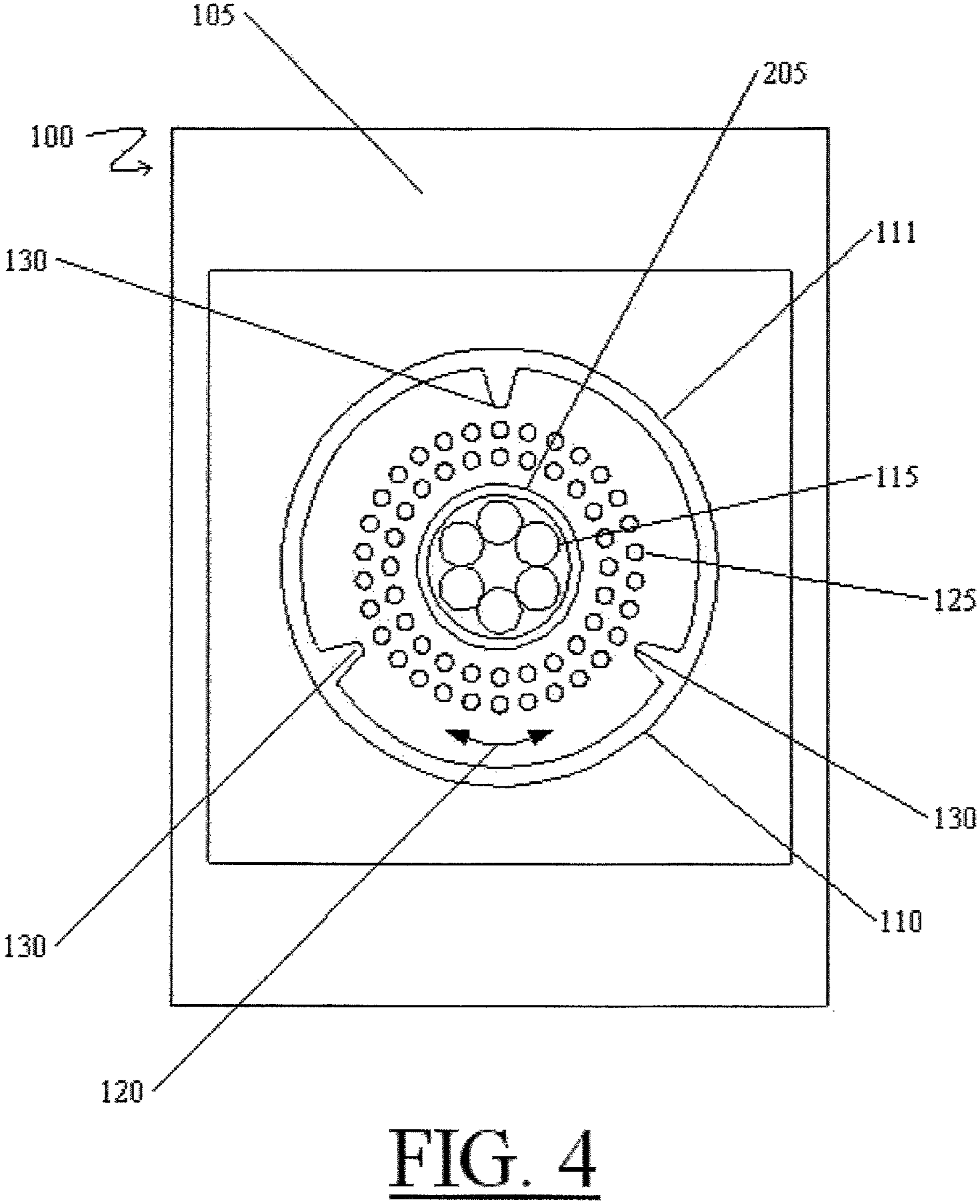

FIG. 4 is a cross-sectional view of a further implementation of a dryer that may have, for example, the same general exterior configuration as the dryer shown in FIG. 1. This cross sectional view is taken about a section that corresponds to Section A-A in FIG. 1. In this implementation, the dryer includes a plurality of ultraviolet light sources that are centrally situated within the dryer's drum.

Figure 5:
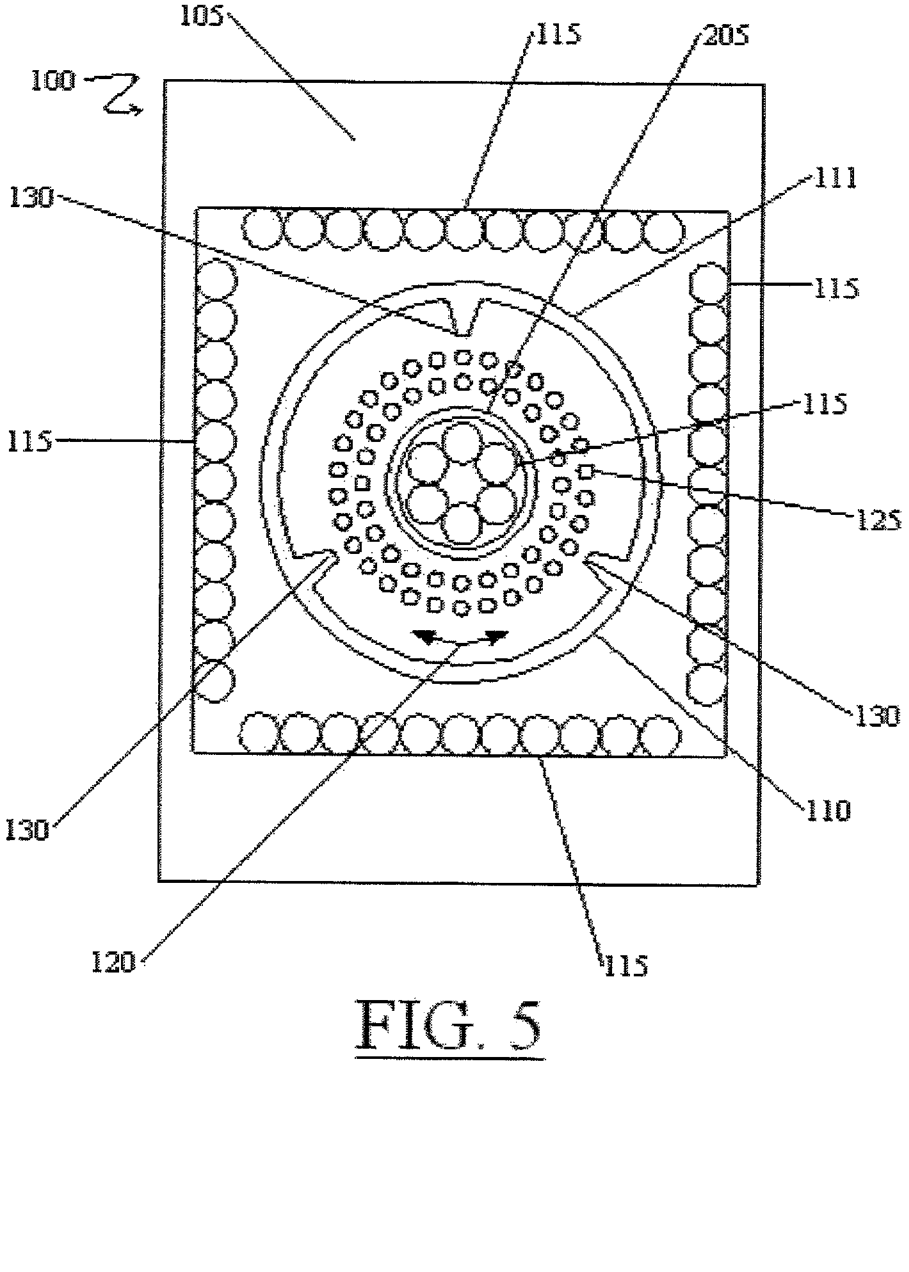

FIG. 5 is a cross-sectional view of yet another implementation of a dryer that may have, for example, the same general exterior configuration as the dryer shown in FIG. 1. This cross sectional view is taken about a section that corresponds to Section A-A in FIG. 1. In this implementation, the ultraviolet light sources are situated both centrally within the drum and adjacent the drum's outer perimeter. In this implementation, the dryer includes multiple ultraviolet light sources that are positioned around the exterior of the dryer's drum.

Figure 6:
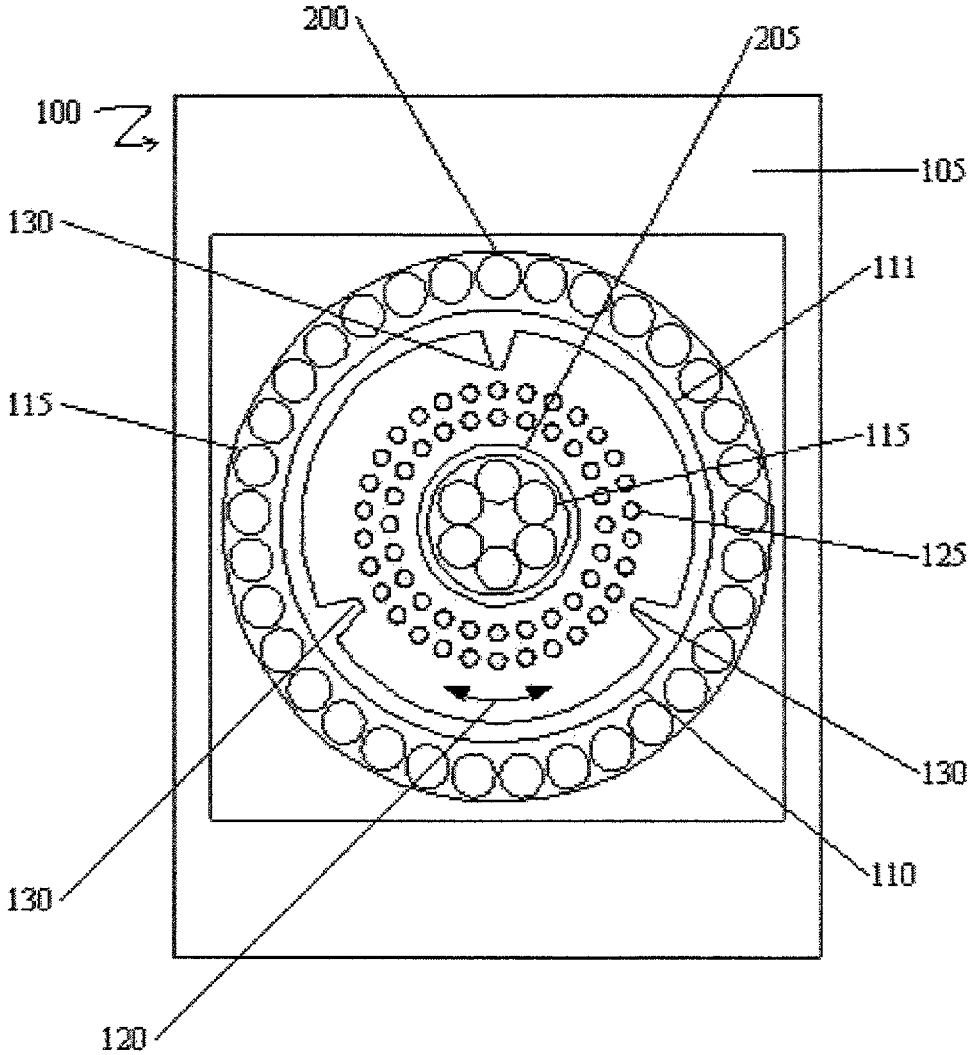

FIG. 6 is a cross-sectional view of a further implementation of a dryer that may have, for example, the same general exterior configuration as the dryer shown in FIG. 1. This cross sectional view is taken about a section that corresponds to Section A-A in FIG. 1. In this implementation, the ultraviolet light sources are also situated both centrally within the drum and adjacent the drum's outer perimeter.

Figure 7:
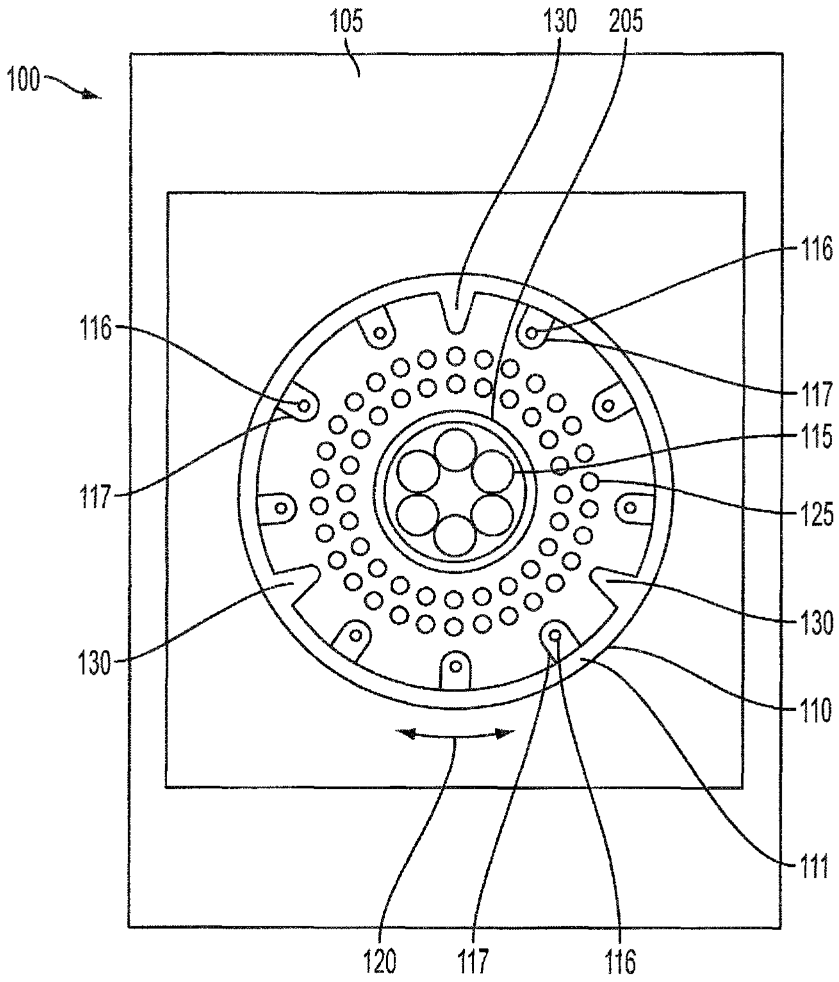

FIG. 7 is a cross-sectional view of a further implementation of a dryer that may have, for example, the same general exterior configuration as the dryer shown in FIG. 1. This cross sectional view is taken about a section that corresponds to Section A-A in FIG. 1. In this implementation, the ultraviolet light sources are also situated both centrally within the drum, and adjacent the drum's outer perimeter (within the drum).

Figure 8:
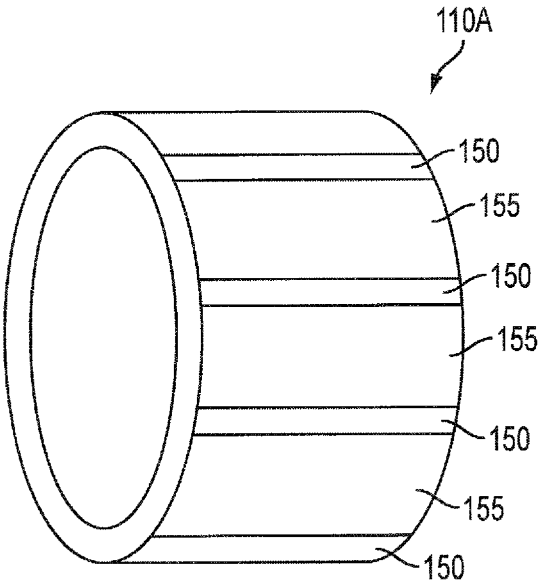

FIG. 8 is a perspective view of a dryer drum according to a particular implementation.

Figure 9:
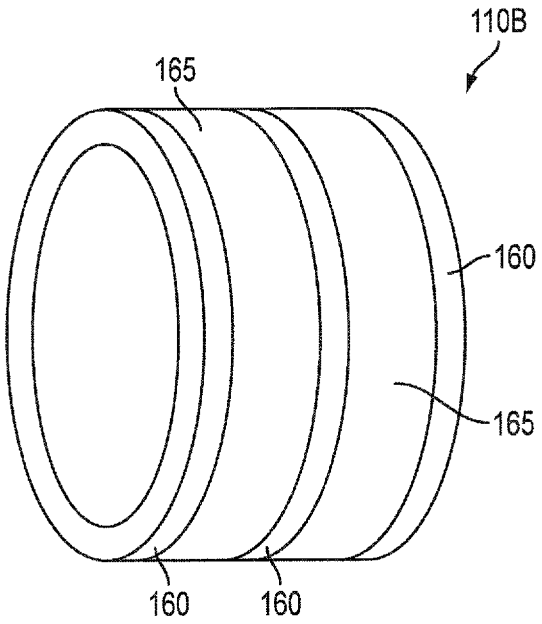

FIG. 9 is a perspective view of a dryer drum according to another implementation.

DETAILED DESCRIPTION

Various implementations of the present invention will now be described more fully hereinafter with reference to the accompanying drawings, in which various implementations of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 is a perspective view of the exterior structure of an exemplary dryer according to a particular implementation. As will be understood from the discussion below, this exemplary exterior structure is suitable for use with a variety of different interior dryer configurations. For purposes of brevity, several different dryer interior configurations are described herein as being suitable for use within the exemplary dryer exterior shown in FIG. 1. It should be understood, however, that these interior dryer configurations may be used within a variety of dryers with different exterior structures.

FIG. 2 is a front, cross-sectional view of a particular implementation of the dryer 100 of FIG. 1 taken about Section A-A. While FIG. 2 illustrates a cross-sectional view of an example dryer that is front-loading, alternative example implementations can also be dryers of the top-loading variety. As shown in FIG. 2, in some example implementations, the dryer 100 includes a housing 105, a UV-permeable (e.g., transparent) drum 110, and one or more UV light sources 115.

Similar to the housing of a conventional clothes dryer, the housing 105 may be of a metallic material, such as a metallic alloy, or any other type of metallic material. The housing 105 may have the same size and style of the housing of a conventional hot air clothes dryer such as that used in a residential household, a laundromat, or any industrial laundering facility.

As shown in FIG. 2, like the drum of conventional clothes dryers, the UV-permeable drum 110 of the dryer 100 may be substantially cylindrical in shape and may have a closed rear. The drum 110 is dimensioned to receive and hold laundry or other fabric articles inside its interior. Also like a conventional dryer, the example dryer 100 may be a front-loading dryer in which one may load clothes into the drum 110 through a front access door (See FIG. 1). The drum 110 may be coupled to a motor in any suitable manner so that the motor may rotate the drum 110 about a central axis as depicted by rotational direction arrow 120 in FIG. 2. The rotation serves to "tumble" the articles contained in the drum 110. The drum 110 may be rotated in a clockwise direction, or a counter clockwise direction. In other example implementations, the drum 110 may be rotated in both clockwise and counterclockwise in an oscillating fashion, or any other fashion.

In various implementations, the drum 110 is made at least partially of a UV-permeable material, such as plastic. Because at least part of the drum 110 is UV-permeable, UV radiation (including UV radiation from one or more UV light sources 115) may pass through the walls of the drum 110. The drum 110 may comprise any suitable percentage of UV-permeable material. In particular implementations, about at least 50%, at least 60%, at least 70%, at least 80%, at least 90%, and/or at least 95% of the drum 110 is made of a UV-permeable material. Many types of plastic materials exist and, depending on design choice, any suitable type of UV-permeable (e.g., transparent) material of varying levels of transparency may be used.

As discussed above, although the entire drum 110 may be made of a UV-permeable material, there is no requirement that 100% of the drum 110 be made of UV-permeable material (whatever that UV-permeable material may be). One may appreciate that nuts, bolts, screws, washers, and other components of the drum 110 may be made of metal, opaque plastic materials, or any other opaque materials. Portions of the drum 110, for example the trap-door of a top-loading dryer 100 having a UV-permeable drum 110, may be made of a non-transparent material.

It should be understood that the drum 110 may come in a variety of different physical configurations. In one implementation, substantially the entire drum is made of one or more types of UV-permeable material, such as a UV-permeable plastic or glass. In another implementation, which is shown in FIG. 8, the drum's outer wall is made of alternating strips of UV-permeable and UV-impermeable material. In the example shown in FIG. 8, the UV-impermeable strips 150 are made of metal, and the UV-permeable strips 155 are made of transparent plastic. As may be understood from FIG. 8, in this implementation, these strips 150, 155 are positioned so that they are substantially perpendicular to the drum's front face. As an aside, within the context of this specification, the UV-permeable strips 155 may all be referred to as part of the drum's "UV-permeable" portion, even though the strips are discontinuous.

In a further implementation, which is shown in FIG. 9, the drum's outer wall is also made of alternating strips of UV-permeable and UV-impermeable material. In the example shown in FIG. 9, the UV-impermeable strips 160 are made of metal, and the UV-permeable strips 165 are made of transparent plastic. As may be understood from FIG. 9, in this implementation, the various strips 160, 165 are substantially circular and are positioned so that the central axis of each circular strip is positioned immediately adjacent, or on, the drum's central axis. In such implementations, the various strips 150, 155 may be regarded as defining a circumferential portion of the drum's exterior.

In certain implementations, the dryer may include a subassembly of one or more ultraviolet lights that are collectively positioned circumferentially around an exterior surface of the drum (e.g., immediately adjacent the drum's UV-permeable strips 155). These one or more ultraviolet lights may be adapted to direct light through the UV-permeable strips 155 around substantially the entire circumference of the drum.)

While various implementations described above indicate that the dryer includes a drum (e.g., a cylindrical drum) for storing wet laundry as the laundry is dried by the dryer, any other suitable receptacle may be used for storing the laundry as the laundry is processed by the drier. Such receptacles may be, for example, in the shape of a suitable conical section, or in the shape of a substantially rectangular prism. In such implementations, the laundry receptacle may be mounted to rotate adjacent an axis (e.g., a central axis of the receptacle). The dryer may include a motor for mechanically driving the receptacle's rotation about this axis. In certain implementations, the receptacle may remain substantially still as the dryer uses ultraviolet light to dry the laundry.

Generally speaking, the more UV-permeable the material, the more ultraviolet light will be able to pass through the material. Because selecting a material that is more or less permeable to UV radiation may have an effect on the amount of UV radiation that may pass through the transparent drum 110, a variety of other design factors of the dryer 100 may be impacted. For example, if a plastic material is selected in which a lower percentage of UV radiation can pass through the material, in at least some cases, it may take longer to dry any wet laundry or other fabric items contained within the drum 110. Or, to dry roughly the same load in roughly the same amount of time, a drum 110 having a lower level of UV-permeability may require more intensity in UV radiation from the UV light sources 115 than the intensity of a drum 110 having a higher level of LTV-permeability; or, a greater number of UV light sources 115 may be required; or, the distance of the UV light sources 115 from the drum 110 may need to be reduced; or the configuration, grouping, or placement of the UV light sources 115 may need to be varied (for example, a circular array with each UV source 115 closer together may need to be used, versus a more spread-out circular array, or a linear array). In various implementations, the drum's materials and the dryer's UV light sources 115 are selected so that the dryer dries a load of laundry of about 2, about 4, about 6, or about 8 pounds in less than about 6 hours, less than about 4 hours, and/or less than about 2 hours.

The drum 110 may also have a closed rear end that defines a plurality of rear vent holes 125 through which water that is evaporated from laundry or other fabric articles during the drying process may exit. A vent fan may be used to assist in the egress of moisture through the vent holes 125. In FIG. 2, the vent holes 125 are shown as circular holes in a polar array in the rear of the drum 110 for illustrative purposes. The vent holes 125, depicted in FIG. 6 in a generally circular shape, may be of any shape or geometry (for example, square, cross, slit, diamond, oval, etc.). It should be understood that the vent holes 125 may be defined by the drum 110 in any suitable location. The vent holes 125 may also be in any suitable pattern (for example, polar, circular, or linear) and number. The vent holes 125 may be formed, for example, by perforating or puncturing holes into the wall of the drum 110. In a top-loading example dryer, the vent holes 125 may be disposed, for example, on the bottom of the drum 110 (opposite the top-loading trap door).

To assist in tumbling wet fabric articles during the drying process, the drum 110 may also have one or more fins 130 (e.g., substantially planar fins) that extend inwardly from the drum's interior surface.

One or more UV light sources 115 may be placed so that they direct UV light through the drum's exterior surface and into the drum's interior (e.g., and onto wet laundry or other fabric articles disposed within the drum 110). For example, the UV light sources 115 may be disposed outside of the drum adjacent the drum's exterior surface and focused so that they direct UV light toward the drum 110.

The UV light sources 115 may be, for example, cylindrical, bulbous, or of any other suitable shape or size. Depending on design choice, the UV light sources 115 may emit more or less UV light, of higher or lower intensity. The UV light sources may, for example, be attached to one or more sides of the interior walls of the dryer's housing 105 and/or to the ceiling and/or floor of the housing 105. Similarly, the UV light sources 115 may be attached to the inside of the access door of the housing 105, and/or to the housing 105 behind the rear of the drum 110. The UV light sources 115 may also, or alternatively, be attached to any other structures, such as rods or brackets, within the housing 105. In some example implementations, the UV light sources 115 may also be detachably mounted so that any UV light sources 115 can be selectively replaced if needed.

As may be understood from FIGS. 2-6, the UV light sources 115 may be grouped in any of a variety of placement configurations. Such placement configurations include, but are not limited to, linear arrays, circular arrays, or polar arrays similar to the polar arrays shown for the vent holes 125 in the implementation of FIG. 2. The individual UV light sources 115 may be positioned, respectfully, in any suitable spatial relationship relative to the other light sources. If cylindrical UV light sources 115 are used, they may likewise be arranged in any fashion, such as a square or rectangular array. Reflectors, such as mirrors, may also be used to reflect or otherwise direct the emitted UV light in the desired direction (e.g., toward the drum's interior). Additionally, clear protective panels may also be used to protect the UV light sources 115.

In some example implementations, as depicted in FIG. 3, one or more of the UV light sources 115 may be mounted inside a protective wall 200 (e.g., a substantially cylindrical protective wall 200), wherein the protective wall 200 at least substantially surrounds (e.g., entirely surrounds) the drum 110. In particular implementations, such as the implementation shown in FIG. 3, the UV light sources 115 are roughly equidistant from the outer perimeter of the drum 110.

In certain example implementations, the UV light sources 115 may be of the elongated cylindrical type. Such UV light sources 115 may be mounted (e.g., by their respective bases) to the housing's back wall. In particular implementations, the UV light sources 115 are roughly equidistant from the outer perimeter of the drum 110. Various methods (including the use of brackets or rods) can be used to attach the UV light sources 115 so that they are at least substantially equidistant from the outer perimeter of the drum 110.

Also, as illustrated in FIG. 4, example implementations may include one or more UV light sources 115 that are situated adjacent the central axis of the drum 110. The centrally situated UV light sources 115 may be, for example, of the elongated cylindrical type, and may be attached by their base to the back wall of the drum 110. In these example implementations, the one or more UV light sources 115 may optionally be surrounded by a UV-permeable (e.g., transparent) housing 205, which may serve to protect the one or more UV light sources 115 from being damaged by laundry that tumbles around it during the rotational operation of the dryer 100. The UV-permeable housing 205 may, for example, be a transparent cylinder or cylindrical dome that surrounds the one or more centrally situated UV light sources 115. The UV-permeable housing 205 may be of any size, shape, or dimension, so as to be capable of accommodating one or more UV light sources 115 of the desired shape, size, and length. In various implementations, the transparent housing 205 can be attached by its base to the back wall of the drum 110. As with the drum 110, the housing 205 surrounding the centrally situated UV light source(s) 115 need not be fully UV-permeable. As with the drum 110, in various implementations, generally speaking, the lower the percentage of the transparent housing 205 that is made of transparent material, the lower the percentage of the UV light that reaches the load in the drum 110, and, as mentioned above, other design choices might be impacted as well.

Still referring to FIG. 4, operationally, as the drum 110 rotates, the one or more centrally situated UV light sources 115 may emit ultraviolet radiation that passes outwardly through the walls of the transparent housing 205 and that irradiates the wet fabric articles surrounding the one or more UV light sources 115 contained within the transparent housing 205. As the wet fabric articles become dry in the drum 110, the evaporated water exits the drum via the drum's vent holes 125. Upon reaching the end of the drying cycle, the drum 110 may coast to a stop, or cease rotating in another appropriate manner, and the UV light sources 115 may be turned off either before or after the rotation stops.

Again referring to FIG. 4, because the one or more UV light sources 115 are situated centrally, in this implementation, the drum that contains the wet laundry need not be transparent. Rather, in such implementations, the drum may be made of the same material as that of a conventional dryer (e.g., the drum may be made of a UV-impermeable metal). However, the inside walls of the drum may be mirrored, coated with a reflective material, or constructed of a polished metal so as to reflect the UV light emitted from the centrally situated one or more UV light sources 115. In particular implementations, substantially the entire surface of the inside walls of the drum 110 may be mirrored, coated, or polished in this manner. However, in other implementations, less than the entire surface of the inside walls of the drum are mirrored, coated, or polished in this manner. In exemplary implementations, about at least 60%, at least 70%, at least 80%, or at least 90% of the inside walls of the drum 110 are mirrored, coated with a reflective material, or constructed of a polished metal so as to reflect the UV light emitted from the centrally situated one or more UV light sources 115 toward the drum's interior.

Referring yet again to FIG. 4, the drum 110 may be manufactured in the shape of an elongated hollow ring. In various implementations, this hollow ring structure has a substantially tubular inner wall 205 and a substantially tubular outer wall 111. The inner wall 205 is positioned within the interior of the outer wall so that the central axis of the inner wall 205 is substantially collinear with the central axis of the outer wall 111. In this implementation, the inner wall 205 may act as the transparent housing that surrounds the one or more centrally located UV light sources 115. In various implementations, if the UV light sources 115 are to be centrally situated only, the outer wall 111 of the drum 110 need not be transparent.

In the example implementations shown in FIG. 5 and FIG. 6, one or more features of the example implementations as described in the text corresponding to FIG. 2, FIG. 3, and FIG. 4 may be implemented concurrently within the same dryer. For example, as shown in both FIG. 5 and FIG. 6, the centrally situated one or more UV light sources 115 may also work in conjunction with UV light sources 115 that surround the outer perimeter of the drum 110. As discussed above, in such implementations, the drum's exterior wall 111 may include one or more UV-permeable portions so that light from the UV light sources may pass through the drum's exterior wall 111.

Also, as may be understood from FIG. 7, in particular implementations, the dryer may include one or more UV light sources 116 that are mounted adjacent the interior surface of the drum's substantially tubular exterior wall 111. These UV light sources 116 may be of any suitable type, and may be encased within a protective, UV-permeable housing 117 as shown in FIG. 7. In various implementations, these UV light sources 116 are spaced substantially evenly apart around the inner circumference of the drum's exterior wall 111.

In the embodiment of FIG. 7, the dryer includes a plurality of UV light sources 115 that are disposed adjacent the drum's central axis. The dryer also includes a UV-permeable barrier 205 that extends around the central UV light sources 115 to prevent laundry from coming into contact with the UV light sources 115. As discussed above, this UV-permeable barrier 205 may be, for example: (1) a substantially tubular inner wall 205 of the drum 110; or (2) a substantially tubular protective wall that is positioned around the UV light sources 115 within the drum's interior. Also, as discussed above in regard to other embodiments of the invention, the interior surface of the drum's exterior wall may be made of, or coated with, a reflective material to reflect UV-light toward the drum's interior. In other implementations, one or more separate reflective components (e.g., mirrors) are mounted adjacent the interior surface of the drum's exterior wall for accomplishing this purpose.

Various concepts described above may also be implemented within the context of a kit that is adapted for use in conjunction with a standard clothes dryer. For example, an ultraviolet dryer retrofit kit according to a particular implementation comprises a UV light source that it adapted to be mounted within the interior of the drum of a standard clothes dryer. In such implementations, the UV light source may, for example, be sufficiently heat resistant to withstand temperatures found within the drums of standard clothes dryers while the clothes dryers are in operation. The UV light source may also include a protective cover (e.g., a UV-permeable cover) that is adapted to protect the UV light source from laundry circulating around the UV light source.

In particular implementations, the UV light source is adapted to be removably mounted (and, in various implementations, electrically connected) within a central portion of the standard clothes dryer's drum. In various implementations, the UV light source assembly (which may, for example, be substantially cylindrical) is adapted to be mounted (and, in various embodiments, electrically connected) so that a central axis of the UV light source assembly is substantially co-linear with a central axis of the clothes dryer's drum as shown, for example, in FIG. 4. Within the context of a UV light source retrofit kit, such as the kit described above, the light source may be adapted: (1) to be stationary when the dryer's drum rotates; or (2) to rotate along with the dryer's drum. The light source may be electrically connected in any suitable way (e.g., through the use of one or more electric brushes, slip rings or other electrical connection mechanisms) to be electrically powered by the dryer's electrical system. In other implementations, the light source may have its own electrical source (e.g., it may be powered by a battery).

In particular embodiments, the dryer 100 includes controls that are adapted to control the operation of the dryer 100. For example, knobs or buttons (or other suitable controls) may be used to increase or decrease the intensity of the UV light sources 115 or to set the amount of time that the dryer 100 would be in operation for the cycle.

Operationally, in example implementations, the user would place a load of wet laundry or other items into the drum 110. The user may use knobs or buttons to set the parameters for the dryer 100 and to start the dryer 100. Upon commencement of operation, the drum 110 begins to rotate. As the drum 110 rotates, the UV light sources 115 emit ultraviolet radiation, which irradiates the wet fabric articles contained within the drum 110. (In particular implementations, the UV radiation passes through the walls of the drum 110 before irradiating the wet fabric articles.) As the wet fabric articles become dry in the drum 110, the evaporated water exits the drum 110 via the vent holes 125. Upon reaching the end of the drying cycle, the drum 110 may coast to a stop, or cease rotating in another appropriate manner, and the UV light sources 115 can be turned off either before or after the rotation stops.

Safety-wise, the dryer 100 may include programming or hardware, such as an interlock device, that may automatically turn off the UV light sources 115 in response to the dryer's access door being opened in order to prevent the continuing operation of the UV light sources 115 until the access door is detected to be closed and/or the drying cycle is resumed or restarted. Additional safety features may prevent the dryer 100 from operating if the dryer's load exceeds a certain weight, which may be caused, for example, by the presence of a child or animal in the dryer 100. Additionally, audio sensors in the dryer 100 may prevent operation of the dryer 100 if sound patterns match that of a screaming or distressed person or animal.

Additionally, if the dryer access door is transparent (e.g., for allowing users to view laundry inside the dryer 100), in order to prevent UV light from causing unwanted damage to skin or eyes, the transparent portion of the door may be coated with UV blocking film. In example implementations, the access door may include a double-paned window, with UV blocking film being applied to the respective inner sides of the window's respective panes (such that the UV blocking material is positioned between the two panes).

Conclusion

Implementations of the subject matter and the functional operations described in this specification can be provided in digital electronic circuitry, or in computer software, firmware, or hardware, including the structures disclosed in this specification and their structural equivalents, or in combinations of one or more of them. Just because a feature is described in one example implementation does not mean that it cannot work with another. Various combinations or subcombinations of features can be used. Thus, the example dryer 100 of this disclosure, and components thereof, may be realized by hardware or software as appropriate, and may include one or more modules of computer readable instructions stored in one or more memory locations that upon execution, for example by one or more processors, cause one or more of the processes or functions mentioned above to be carried out. Processors suitable for the execution of a computer program include, by way of example, both general and special purpose microprocessors, and any one or more processors of any kind of digital computer.

While this specification contains many specific implementation details, these should not be construed as limitations on the scope of any invention or of what may be claimed, but rather as descriptions of features that may be specific to example implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. It is intended that the scope of the invention be defined by the claims appended hereto and their equivalents.

What is claimed is:

1. A clothes dryer comprising:

a housing;

a laundry receptacle, disposed within said housing, that is dimensioned to receive a load of wet laundry that is to be dried by said clothes dryer, said laundry receptacle comprising at least one ultraviolet permeable portion that is permeable to ultraviolet light; and an ultraviolet light assembly that is adapted to direct ultraviolet light through said ultraviolet permeable portion of said laundry receptacle, wherein:

said clothes dryer is adapted to dry a load of wet laundry that is disposed within said laundry receptacle by transmitting ultraviolet light through said ultraviolet permeable portion of said laundry receptacle.

2. The clothes dryer of claim 1, wherein:

said laundry receptacle is rotatably mounted within said housing, and said clothes dryer further comprises a motor that is adapted for rotating said laundry receptacle.

3. The clothes dryer of claim 2, wherein:

said ultraviolet light assembly comprises a subassembly of one or more ultraviolet light sources that are collectively positioned circumferentially around an exterior surface of said laundry receptacle.

4. The clothes dryer of claim 2, wherein said clothes dryer is adapted to dry a wet load of at least about four pounds of laundry by transmitting ultraviolet light through said laundry receptacle.

5. The clothes dryer of claim 4, wherein said clothes dryer is adapted to dry said wet load of at least about four pounds of laundry within less than about 6 hours.

6. The clothes dryer of claim 2, wherein at least about 30% of said laundry receptacle's outer surface is permeable to ultraviolet light.

7. The clothes dryer of claim 2, wherein at least about 50% of said laundry receptacle's outer surface is permeable to ultraviolet light.

8. The dryer of claim 2, wherein at least about 70% of said laundry receptacle's outer surface is permeable to ultraviolet light.

9. The clothes dryer of claim 2, wherein said clothes dryer is adapted to dry said wet load of laundry without using a non-ultraviolet heating element to substantially heat said wet load of laundry.

10. The clothes dryer of claim 2, wherein said laundry receptacle is a substantially cylindrical drum.

11. The clothes dryer of claim 2, wherein:

said ultraviolet permeable portion of said receptacle extends substantially entirely around a circumference of said laundry receptacle.

12. The clothes dryer of claim 1, wherein said clothes dryer is adapted to dry said load of wet laundry without using a non-ultraviolet heating element or other non-ultraviolet drying technique to substantially dry said wet load of laundry.

13. A clothes dryer comprising:

a housing;

a laundry receptacle that is rotatably mounted within said housing, said laundry receptacle defining an interior portion that is dimensioned for receiving a load of laundry;

a motor that is adapted for rotating said laundry receptacle; and one or more ultraviolet light assemblies that are adapted to direct ultraviolet light onto said load of laundry to dry said load of laundry while said load of laundry is disposed within said interior portion of said laundry receptacle.

14. The clothes dryer of claim 13, wherein said one or more ultraviolet light assemblies comprise a first ultraviolet light source that is mounted adjacent a central axis of said laundry receptacle.

15. The clothes dryer of claim 13, wherein said one or more ultraviolet light assemblies comprise:

a first ultraviolet light source that is mounted within said interior portion of said laundry receptacle and that is positioned to direct ultraviolet light onto said load of laundry while said load of laundry is disposed within said interior portion of said laundry receptacle.

16. The clothes dryer of claim 15, wherein said first ultraviolet light source is adapted to direct ultraviolet light onto said load of laundry while said load of laundry is disposed within said interior portion of said laundry receptacle and while said laundry receptacle is rotating.

17. The clothes dryer of claim 15, wherein said first ultraviolet light source is mounted adjacent a central axis of said laundry receptacle.

18. The clothes dryer of claim 17, wherein said clothes dryer further comprises an ultraviolet permeable barrier that is positioned and dimensioned to prevent said load of laundry from contacting said first ultraviolet light source.

19. The clothes dryer of claim 18, wherein said ultraviolet permeable barrier is substantially cylindrical.

20. The clothes dryer of claim 13, wherein:

said one or more ultraviolet light assemblies comprises:

(A) a first ultraviolet light source that is mounted adjacent a central axis of said laundry receptacle, and (B) a second ultraviolet light source that is mounted adjacent an outer wall of said laundry receptacle; and said first and second ultraviolet light sources are each adapted for directing ultraviolet light into said laundry receptacle.

* * * * *